Dec. 25, 1962  N. L. MUENCH  3,070,697
APPARATUS FOR THE PRODUCTION OF INTENSE BURSTS OF NEUTRONS
Filed Oct. 4, 1957

INVENTOR.
NILS L. MUENCH,
BY John A. Schneider
ATTORNEY.

United States Patent Office 3,070,697
Patented Dec. 25, 1962

3,070,697
APPARATUS FOR THE PRODUCTION OF INTENSE BURSTS OF NEUTRONS
Nils L. Muench, Houston, Tex., assignor, by mesne assignments, to Jersey Production Research Company, Tulsa, Okla., a corporation of Delaware
Filed Oct. 4, 1957, Ser. No. 688,316
2 Claims. (Cl. 250—83.3)

This invention relates to means for obtaining intense bursts of neutrons. In its more particular aspects, the invention is directed to means for obtaining intense bursts of neutrons adaptable for use in well bores for investigation of subsurface formations penetrated by the well bore.

It is known to apply radioactive techniques to the exploration of boreholes drilled in the earth's crust. One general type of such exploration involves the bombardment of the surface formation under consideration with neutrons and observation of the radioactivity thereby induced in the formation. In this type of exploration it is desirable for economic reasons that the time devoted to investigation of the subsurface formation be short. An intense neutron source provides short investigation time intervals.

Further, U.S. patent application Serial No. 616,687, filed October 18, 1956, entitled "Method of Nuclear Borehole Logging," by Nils L. Muench and Hezzie R. Brannon, now abandoned, discloses investigative advantages of a neutron source which may be pulsed "on" and "off."

Also, pulse duration is useful and important for measurement of induced delayed radiations from elements having very short half-lives. In U.S. patent application Serial No. 616,713, entitled "Method of Logging Wells by Induced Delayed Radiation," filed October 18, 1956, by James A. Rickard, now U.S. Pat. No. 2,963,586, a method of well logging is described utilizing measurements on decay half-life of induced radiation.

Neutron sources, in general, are limited to continuous or semi-continuous operation. The neutron fluxes produced thereby are approximately $10^7$ neutrons per second. This flux is relatively low which limits logging speed and thereby delays well operations.

Therefore, it is of value to have a means whereby a much more intense neutron flux may be obtained for short periods of time, for example, of the order of a few microseconds.

The invention, in brief, comprises a device for producing an intense burst of neutrons including a first mass of fissionable material, a second mass of fissionable material adapted to be moved into and out of said first mass of fissionable material, means for controlling movement of said second mass of fissionable material and adjustment means adapted to adjust the size of said first mass of fissionable material.

Thus, an object of this invention is to provide means to obtain a short intense burst of neutrons. This and other objects of the invention will be apparent from the following description of the invention taken in conjunction with the drawings wherein.

Figure 1:
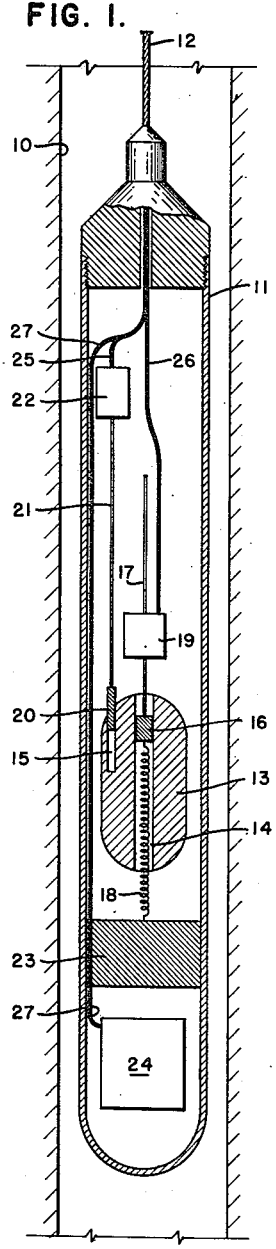
FIG. 1 is a vertical view, partly in section, of one embodiment of the invention arranged in a borehole.
Figure 2:
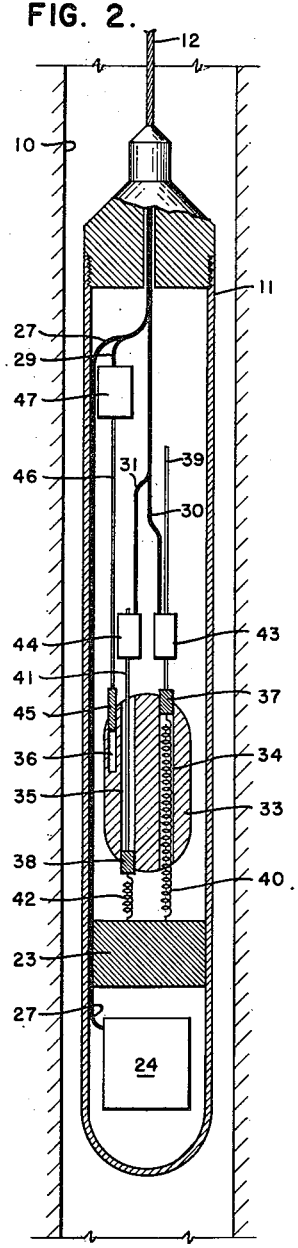
FIG. 2 is a vertical view, partly in section, of another embodiment of the invention arranged in a borehole.
Figure 3:
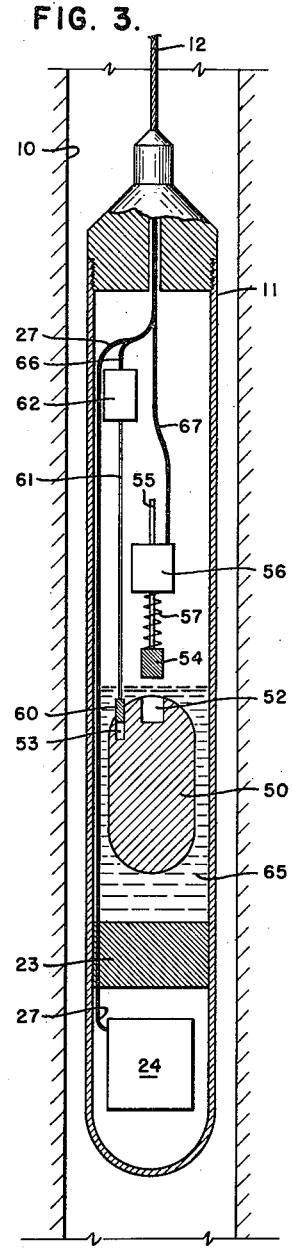
FIG. 3 is a vertical view, partly in section, of still another embodiment of the invention arranged in a borehole.

In FIGS. 1 through 3 is shown a borehole 10 in which is arranged a casing or housing 11. A cable 12 is connected to housing 11 and is adapted to raise and lower housing 11 in borehole 10. Cable 12 may contain electrical conductors for supplying electrical power to various elements contained in housing 11.

Referring specifically to FIG. 1, a mass of fissionable material 13, formed to provide an opening 14 therethrough and a recessed portion 15 is shown arranged in housing 11. A slug of fissionable material 16 is shown positioned in opening 14. A control mass of fissionable material 20 is positioned in recess 15. A control rod 21 connects control mass 20 to a control unit 22. A shield 23 is arranged between fissionable material 13 and a radiation detector 24.

A vertically movable rod 17 is connected to one side of the slug of fissionable material 16 and a spring 18 is connected to the other side thereof. Rod 17 extends through a solenoid 19 which is adapted to move or draw slug 16 upward and out of fissionable material 13. Spring 18, one end of which may be connected to shield 23 as shown, is adapted to move slug 16 downward and out of fissionable material 13. Thus, solenoid 19 and spring 18 cooperate to cause slug 16 to oscillate into and out of fissionable material 13.

Electrical conductors 25, 26, and 27 are shown connected to control unit 22, solenoid 19 and detector 24, respectively. Conductors 25 and 26 are each connected to a source of electrical energy, not shown, for actuating control unit 22 and solenoid 19 while conductor 27 is connected to electronic equipment, not shown, which is well known in the art for measuring electrical signals generated in response to radiation detected by the radiation detector.

The mass of fissionable material 13 is sub-prompt critical at all times. However, the mass approaches prompt critical closely when slug 16 enters the mass of fissionable material 13. The control mass of fissionable material 20 is inserted more or less into the mass of fissionable material 13 by means of the control unit 22 and control rod 21 to obtain the correct adjustment of the size of the fissionable material 13, which may be spherical or other shape.

To operate, housing 11 is lowered in borehole 10 by means of cable 12 until the tool is positioned adjacent a formation it is desired to investigate. The position of the control mass of fissionable material 20 in fissionable material 13 is then adjusted by means of control unit 22. At this time solenoid 19 is deenergized which permits spring 18 to maintain slug 16 outside of mass 13. To obtain an intense burst of neutrons solenoid 19 is energized which causes the slug of fissionable material 16 to move upwardly through the opening 14 in the mass of fissionable material 13. Movement of the slug 16 through the fissionable material 13 produces neutron pulses. By periodic energization of solenoid 19, slug 16 is caused to oscillate into and out of the fissionable mass of material 13. When the slug of fissionable material 16 enters the fissionable material 13, neutrons are produced in abundance.

The arrangement of FIG. 1 may produce neutron bursts of any desired intensity; however, the bursts will be of relatively long duration, for example, of the order of about $10^{-3}$ seconds.

The minimum pulse duration is set by the transit time of the fissionable slug 20 in traversing the fissionable mass 13. Thus, if slug 16 travels 500 feet per second and the length of the traverse is one-half foot, then the pulse length is $10^{-3}$ seconds. The neutrons emitted by the fissionable material react in the formation surrounding the borehole and the radiation resulting from such reactions is detected by the radiation detector 24. The information obtained by the radiation detector is transmitted to the earth's surface where it is analyzed.

The apparatus, including spring 18, rod 17, and solenoid 19, by which slug 16 is shot through the fissionable mass of material 13 is not the only apparatus that may be utilized. Other mechanisms as, for example, percussion devices or cams may be used instead.

FIG. 2 illustrates a modification of the arrangement shown in FIG. 1. Specifically, two fissionable slugs are used instead of one so as to achieve a shorter pulse duration. The presence of both slugs in the fissionable mass is necessary to produce a neutron burst. One slug enters the fissionable mass just before the other slug leaves the fissionable mass. Shorter pulse durations of the order of $10^{-4}$ to $10^{-5}$ seconds are obtainable by this arrangement.

Housing 11 contains a mass of fissionable material 33 formed to provide two openings 34 and 35 extending therethrough and a recess 36. Slugs of fissionable material 37 and 38 are adapted to travel in openings 34 and 35, respectively. A rod 39 and a spring 40 are connected to slug 37. Similarly, a rod 41 and a spring 42 are connected to slug 38. Rod 39 extends through a solenoid 43 and rod 41 extends through a solenoid 44. A control mass of fissionable material 45 is arranged in recess 36. Control mass 45 has connected thereto a control rod 46 which is, in turn, connected to a control unit 47. A radiation shield 23 is positioned in housing 11 below fissionable material 33 and above a radiation detector 24. As in the embodiment of FIG. 1, the mass of fissionable material 33 is sub-prompt critical at all times although a prompt critical value is approached closely when the slugs 37 and 38 are both within the mass of fissionable material 33. As in the embodiment of FIG. 1, conductors are shown for connecting the electrical apparatus to sources of electrical energy or to electrical signal measuring equipment. Thus, conductor 29 connects to control unit 47, conductors 30 and 31 connect to solenoids 43 and 44, respectively, and conductor 27 connects to detector 24.

To operate, housing 11 is lowered in the borehole by means of cable 12 until housing 11 is positioned adjacent a subsurface formation which it is desired to investigate. Then, the control mass of fissionable material 45 is adjusted in recess 36 by means of the control unit 47 and connecting rod 46. At this time solenoids 43 and 44 are deenergized. In this state springs 40 and 42 keep slugs 37 and 38, respectively, outside of and below mass 33. Then, solenoids 43 and 44 are energized sequentially to draw the slugs of fissionable material 37 and 38, repectively, upwardly in sequence through the mass of fissionable material 33. Springs 40 and 42, shown connected to shield 23, are employed in conjunction with the solenoids 43 and 44 to draw slugs 37 and 38 downwardly upon deenergization of solenoids 43 and 44 respectively. This causes slugs 37 and 38 to oscillate into and out of the fissionable mass 33. Solenoids 43 and 44 are synchronized slightly out of phase such that slug 37 enters the mass of fissionable material 33 just before slug 38 leaves the mass of fissionable material 33. However, the presence of both slugs 37 and 38 in fissionable mass 33 is required to produce a neutron burst. The neutrons are produced in abundance when the slugs 37 and 38 enter the fissionable mass 33. An alternate means of achieving this pulsed operation is to place fissionable slugs 37 and 38 on a single rod spaced-apart a distance slightly less than the length of the path through fissionable mass 33. In this instance, control of the pulsed operation is achieved by varying the spacing between slugs 37 and 38 or by varying the speed of the rod on which these slugs are mounted.

As in the embodiment of FIG. 1, the neutrons emitted by the fissionable material enter the formations surrounding the borehole and react therein. Radiation resulting from such reactions is detected by radiation detector 24 and translated into electrical energy. The electrical signals generated thereby are transmitted to the earth's surface where they are analyzed. Other mechanisms may be substituted for the solenoids and springs for moving the slugs through the mass of fissionable material 33.

The embodiment of FIG. 3 differs from the embodiment of FIGS. 1 and 2 in that the fissionable mass is super-prompt critical when the slug is first inserted but falls below critical after heating. Thus, in FIGS. 1 and 2, the neutron burst terminates by exit of the slug or slugs. Whereas in FIG. 3, the neutron burst terminates by thermal expansion. The pulse duration obtained by the arrangement of FIG. 3 is quite short; that is, of the order of approximately $10^{-6}$ seconds and the neutron flux is quite large, in excess of $10^{16}$ neutrons per pulse.

A mass of fissionable material 50 is arranged in housing 11 and is formed to provide recesses 52 and 53. A slug of fissionable material 54 having connected thereto a rod 55 is adapted to be driven into and out of fissionable mass 50. A solenoid 56 and a spring 57 surround rod 55.

A control mass of fissionable material 60 is shown arranged in recess 53. Connected to control mass 60 is a rod 61 which connects to a control unit 62. Coolant means indicated by fluid 65 surrounds fissionable mass 50. A radiation shield 23 is arranged between fissionable mass 50 and a radiation detector 24.

As in the previous two embodiments connections to the apparatus are made for transmitting electrical energy. Thus, conductor 66 is connected to control unit 62; conductor 67 is connected to solenoid 56 and conductor 27 is connected to detector 24.

To operate, housing 11 is lowered in the borehole by means of cable 12 to adjacent a formation it is desired to investigate as in the embodiment of FIGS. 1 and 2. The control fissionable mass 60 is positioned in recess 53 by means of control unit 62 and connecting rod 61. Then, when it is desired to bombard the subsurface formation or formations, solenoid 56 is energized which causes slug 54 to be driven into fissionable mass 50. The mass of the slug 54 is carefully chosen so that when the slug is inserted in the mass 50 the total mass of the fissionable material 50 and slug 54 is just prompt critical. In an extremely short time the fission of the fissionable material nuclei proceeds rapidly. Each fission produces on an average about 3 neutrons and releases a great amount of energy. The energy released heats the mass of fissionable material 50 to a high temperature which, in turn, causes mass 50 to expand and reduce the density of the mass to below critical. The number of fissions decays rapidly and the production of neutrons effectively ceases until the mass 50 cools and contracts to critical mass. Before this occurs, solenoid 56 is deenergized and spring 57 retracts the slug of fissionable material 54 from mass 50. Mass 50 cools rapidly because of the large temperature difference between it and the surrounding earth.

The neutrons produced by the fissionable material react in the formations surrounding the borehole and the resulting radiation is detected by the radiation detector 24 whence the information detected is transmitted to the surface of the earth where it is analyzed.

The fissionable material may be uranium 235, uranium 233, polonium 239, etc. The shape of the large mass of fissionable material may be spherical or any other desired shape. The control mass and control unit employed in each embodiment are in the nature of a self-compensating adjustment to offset the effect of the variations in the material surrounding the fissionable material.

Control mechanism for controlling actuation of the solenoids and of the control units have not been shown or described in detail herein since such mechanism is well-known in the art. Control mechanisms adaptable for use in this invention may be found in "Control of Nuclear Reactors," Proceedings Institution of Electrical Engineering, 103, 577 (1956), by R. J. Cox and J. Walker or "Control and Instruments of Nuclear Reactors," Proceedings Institution of Electrical Engineering, 103, 564 (1956), by A. B. Gillespie.

Although the operation of the invention has been described herein relative to well logging, the invention has other uses and is not to be considered as limited thereto.

Having fully described the nature, objects, elements and operation of my invention, I claim:

1. Apparatus for use in investigating subsurface formations penetrated by a borehole by bombarding said formations with neutrons and observing the radioactivity induced thereby comprising a housing suspended in said borehole and containing means for producing intense bursts of neutrons including a mass of fissionable material, a first slug of fissionable material movable into and out of said mass and adapted to traverse completely said mass, a second slug of fissionable material movable into and out of said mass and adapted to traverse completely said mass, said mass being maintained subprompt critical at all times, means for controlling movement of said first and second slugs, and adjustment means adapted to adjust the size of said mass; said housing also containing means for detecting induced radiation resulting from said bursts of neutrons; and means for supplying electrical power to operate said neutron-producing means and said radio-activity detector.

2. Apparatus for use in investigating subsurface formations penetrated by a borehole by bombarding said formations with neutrons and observing the radioactivity induced thereby comprising a housing suspended in said borehole and containing means for producing intense bursts of neutrons including a mass of fissionable material, a first slug of fissionable material movable into and out of said mass and adapted to traverse completely said mass, a second slug of fissionable material movable into and out of said mass and adapted to traverse completely said mass, said mass being maintained subprompt critical at all times, and means for controlling movement of said first and second slugs, said first slug entering said mass as said second slug leaves said mass and vice versa; said housing also containing means for detecting induced radiation resulting from said bursts of neutrons; and means for supplying electrical power to operate said neutron-producing means and said radioactivity detector.

References Cited in the file of this patent

UNITED STATES PATENTS

| | | |
|---|---|---|
| 2,781,307 | Wigner | Feb. 12, 1957 |
| 2,951,943 | Goodman | Sept. 6, 1960 |

FOREIGN PATENTS

| | | |
|---|---|---|
| 132,646 | Australia | May 17, 1949 |

OTHER REFERENCES

The Atomic Story, by John W. Campbell, Henry Holt & Co., N.Y., 1947. Page 211.

TID–5360, U.S. Atomic Eenergy Commission. A Summary of Accidents and Incidents Involving Radiation in Atomic Energy Activities, June 1945 through December 1945. By Daniel F. Hayes. August 1956. Pages 2 to 6.

De Hoffman et al.: Physical Review, Vol. 74, No. 10, Nov. 15, 1948, pp. 1330–1337.

Nuclear Fission and Atomic Energy, by William E. Stephens (editor), pages 178, 179, published by Science Press, Lancaster, Pa. 1948.

J. Nuclear Energy, 1954, Vol. 1, pp. 47 to 50.

Los Alamos Scientific Laboratory of the University of California. The Time Behavior of Godina Through Prompt Critical. LA–2029. Report distributed May 23, 1956. Available from U.S. Atomic Energy Commission, Technical Information Extension, P.O. Box 1001, Oak Ridge, Tenn. pp. 11, 12, 13, 14, 15, 16, 32, 34, 35.

Chemical and Engineering News, April 8, 1957. Page 80.